United States Patent [19]
Kelly

[11] Patent Number: 6,018,247
[45] Date of Patent: Jan. 25, 2000

[54] TIME DOMAIN REFLECTOMETER LINEAR POSITION SENSING

[76] Inventor: John Michael Kelly, 9 Canon Ridge, Fairport, N.Y. 14450

[21] Appl. No.: 09/025,953

[22] Filed: Feb. 19, 1998

[51] Int. Cl.[7] .................................................... G01R 31/11
[52] U.S. Cl. ........................ 324/644; 324/643; 73/304 C; 73/314
[58] Field of Search .............................. 73/304 R, 304 C, 73/314; 324/534, 644, 643

[56] References Cited

U.S. PATENT DOCUMENTS

| | | |
|---|---|---|
| 3,599,120 | 8/1971 | Thibault .................................. 324/642 |
| 3,853,005 | 12/1974 | Schendel . |
| 4,395,711 | 7/1983 | Ward . |
| 4,667,158 | 5/1987 | Redlich . |
| 4,926,123 | 5/1990 | Redlich . |
| 4,987,823 | 1/1991 | Taplin et al. . |
| 5,115,193 | 5/1992 | Bean et al. . |
| 5,216,364 | 6/1993 | Ko et al. . |
| 5,717,337 | 2/1998 | Kelly . |

OTHER PUBLICATIONS

Lindström et al. "A New Instrument for the Measurement of Liquid Level." The Rev. of Sci. Instruments. vol. 41, pp. 1083–1087 (Jul. 1970).

Erickson et al. "The Compensation of Delay Distortion in Video Delay Lines," Proc. of the I.E.E. pp. 1036–1039 (Sep. 1950).

Kallman, Heinz E. "Equalized Delay Lines," Proc. of the I.R.E. and Waves and Electrons, pp. 646–657, (Sep. 1946).

*Primary Examiner*—Josie Ballato
*Assistant Examiner*—Jose M. Solis

[57] ABSTRACT

A time domain reflectometry linear position sensing system having a transmission line with a helically wound inductor and a ground conductor. The transmission line includes a movable member that electrically connects with the ground member and which extends along the inductor from a first end a distance that depends on the position of an object whose position is being determined. A signal generator applies pulses between the first end and the ground conductor and a receiver receives reflections of those pulses. The delays between the applications of pulses and the receptions of reflections depend upon the position of the object. A position determining circuit determines the position of the object based upon the delays, beneficially by using sing-around. Beneficially, a third member extends a predetermined distance along the inductor from a second end. That third member provides a reference delay that can improve the system accuracy.

20 Claims, 4 Drawing Sheets

TIME DOMAIN REFLECTOMETER LINEAR POSITION SENSING

FIELD OF THE INVENTION

This invention relates to the use of time domain reflectometry in determining the position of an object.

BACKGROUND OF THE INVENTION

The most common instrument for determining the linear position of an object is probably the Linear Variable Differential Transformer, or LVDT. An LVDT is comprised of a primary winding, two secondary windings, and a movable magnetic rod that is attached in some manner to an object whose position is being determined. With an AC signal applied to the primary winding the magnetic coupling between the primary winding and the secondary windings varies according to the position of the magnetic rod, which in turn varies according to the position of the object. As the magnetic coupling changes the relationship between the outputs of the secondary windings changes. That relationship is used to determine the position of the object. LVDTs are capable of impressive accuracy, achieving sub-millimeter accuracy in some applications.

However, LVDTs tend to be relatively large, because an LVDT needs to be about twice as long as the range of motion to be measured, heavy, since a magnetic rod is required, difficult and expensive to manufacture, since three coils must be carefully wound on a core, and difficult to use, since electrical connections are required for each of the coils and since the relationship between the outputs of the secondary windings and the position of the object is not simple.

Various alternatives to the linear voltage differential transformer are known in the prior art. For example, U.S. Pat. No. 4,667,158, which issued on May 19, 1987 to Robert W. Redlich and which is entitled, "Linear Position Transducer And Signal Processor" discloses an inductive linear displacement transducer and an associated signal processor. As understood, U.S. Pat. No. 4,667,158, teaches a hollow, electrically insulated bobbin that is wound with wire to form an inductor. Partially inserted into the bobbin is a movable, conductive, but non-magnetic rod that has one end attached to an object whose position is being sensed and another end within the inductor. Surrounding the bobbin is a conductive shield that tends to confine the magnetic flux produced by the inductor inside the sensor. A magnetic, insulative layer is disposed between the inductor and the conductive shield. In operation an AC source excites a bridge circuit which has the inductor as one of its branches. Because of the skin effect, the magnetic flux within the bobbin, and thus the inductance of the inductor, depends upon the degree of insertion of the core into the bobbin. Since the output of the bridge depends upon the inductor's inductance, it is an indication of the insertion of the rod into the bobbin.

Various improvements to U.S. Pat. No. 4,667,158 have been made. For example, U.S. Pat. No. 4,926,123, which issued on May 15, 1990 to Robert W. Redlich and which is entitled "Precision Variable Pitch Compensation Winding for Displacement Transducer," teaches a compensating winding; and U.S. Pat. No. 5,115,193, which issued on May 19, 1992 to Bean et al., and entitled, "Inductive Displacement Transducer and Temperature-Compensating Signal Processor" teaches a method of temperature compensating linear positions sensors similar to that disclosed in U.S. Pat. No. 4,667,158. However, even with these improvements linear position sensing systems similar to that of U.S. Pat. No. 4,667,158 may not be optimal.

Wound inductors have been used in other measurement systems. For example, K. Lindstrom, H. Kjellander, and C. Johnson in "A New Instrument for the Measurement of Liquid Level," *The Review of Scientific Instruments*, pages 1083–87, Volume 41, number 7, July 1970 describe a liquid level monitoring instrument in which a transmission line having a helical wound conductor is used with time-domain reflectometry to determine the level of a liquid in a tank. Time-domain reflectometry is a measurement technique in which the time between the application of a pulse on a transmission line and the appearance of either that pulse or its reflection is used to determine some property of a system, typically the length of the transmission line or the location of an open, short, or connection on that line. It should be noted that time domain reflectometry also can be used to measure other properties, such as soil moisture or the permittivity of materials. In Lindstrom et al. electromagnetic pulses are impressed on their transmission line such that a liquid whose level is being measured can become between the helically wound conductor and an outer shield. The time required for a pulse to be impressed on the transmission line, to travel down that line, to reflect off of an interface between the liquid and a gas which fills the remainder of the line, and to return to the point of impression is used to determine the position of the liquid-gas interface.

Helically wound transmission lines are slow wave transmission lines. A slow wave transmission line is one having an effective speed of pulse propagation that is significantly less than the speed of pulse propagation in free space. By effective speed of propagation it is meant the axial speed of propagation (pulses in helical transmission lines spiral at high velocities, but axially propagate at a much slower speed). Slow wave transmission lines are advantageous since they change the problem of determining time intervals that result from pulses traveling at about 300,000,000 meters per second to the far simpler problem of dealing with time intervals that result from a pulse that travels much slower.

While slow wave transmission lines visually resemble the helical inductor/outer conductor of U.S. Pat. Nos. 4,667,158; 4,926,123; and 5,115,193, helically wound transmission lines operate differently. Input signals are not applied across the inductor, they are applied between the helically wound inductor and the ground conductor. Helically wound transmission lines are two port devices (even though an instrument according to the principles of the present invention might use only one port) that transmit signals from one location to another.

Lindstrom et al. also teach the use of sing-around. Sing-around is an advantageous technique that provides a simple, reliable, low cost method of converting pulse transient times (delays) into oscillations that have periods and frequencies which are easily measured. In Lindstrom et al. a pulse is impressed at the proximal end of the helically wound transmission line, that pulse travels along that line until it reflects from a material interface, the reflection travels back to the proximal end where the reflection is sensed and used to trigger another transmission line pulse. This process repeats, producing pulses at a frequency that depends upon the position of the material interface.

While helically wound transmission lines are advantageous in that they are low cost, rugged, and reliable it seems that, except for delay lines, they have been little used. Specifically, no prior use of a helically wound transmission line in a linear position sensor is known to the inventor. While this be an oversight, it seems that others have not fully appreciated helically wound transmission lines. Because of their low cost and general simplicity, time domain reflectometry linear position sensing, particularly those that use helically wound transmission lines, would be beneficial.

SUMMARY OF THE INVENTION

The present invention provide for slow wave transmission line time domain reflectometry linear position sensing. An instrument according to the principles of the present invention will include a transmission line sensor comprised of a single layer inductor that is formed by helically winding a conductor around an elongated cylindrical element. A first conductive member extends along that inductor, and a movable second conductive member extends along part of the inductor, but also extends beyond the inductor. The transmission line sensor is arranged such that the inductor is disposed between the first conductive member and the second conductive member, and such that the first and second conductive members are electrically shorted together.

One application of a transmission line sensor that is in accordance with the principles of the present invention is in a linear position determining system. In such a system a pulse generator beneficially applies electrical pulses between the inductor and the conductive members and a receiver receives reflections caused by the terminating end of the movable second conductive member. That second conductive member is operatively connected to an object whose position is being determined. Delays between the applications of pulses and the receptions of reflections depend upon the position of the object. A position determining circuit determines the position of the object based upon those delays. Beneficially a display operatively connected to the positioning determining circuit indicates the position of the object.

One particularly beneficial linear position determining system includes a third conductive member that extends along the inductor from an end a predetermined distance while the movable second conductive member extends along the inductor from the other end. The third conductive element acts as a reference. The position determining circuit then beneficially determines the position of the object based upon delays between the applications and the receptions of pulses from each end of the inductor.

In a particularly beneficial linear position determining system the inductor is formed by winding a conductor in a single layer around a thin-walled tube, and the first conductive member takes the form of a tubular outer shield that surrounds the inductor. In that system the movable second conductive member is an elongated, electrically conducting, movable rod that is inserted into the hollow tube; wherein the degree of insertion depends upon the position of the object. Even more beneficial is the inclusion of a fixed third conductive element that is made from the same rod as the movable second conductive element. That third conductive element is located at the opposite end of the inductor as the movable rod. The third conductive element, which is electrically connected to the movable ground element and to the outer shield, extends into the inductor a predetermined distance and acts as a reference element. Then by determining the delays between the applications of pulses and the receptions of reflections from each end of the inductor, and by taking into account the distance that the third conductive element extends into the helical winding, the accuracy of the determination of the position of the objection can be improved.

BRIEF DESCRIPTION OF THE DRAWINGS

Other aspects of the present invention will become apparent as the following description proceeds and upon reference to the drawings, in which.

Note that in the drawings that like numbers designate like elements.

DETAILED DESCRIPTION OF A PREFERRED EMBODIMENT OF THE PRESENT INVENTION

While the principles of the present invention are described in relation to a preferred embodiment linear position determining system it is to be understood that the present invention may find use in other embodiments and in many applications. Therefore, it is to be understood that the described embodiment is exemplary only.

Figure 1:
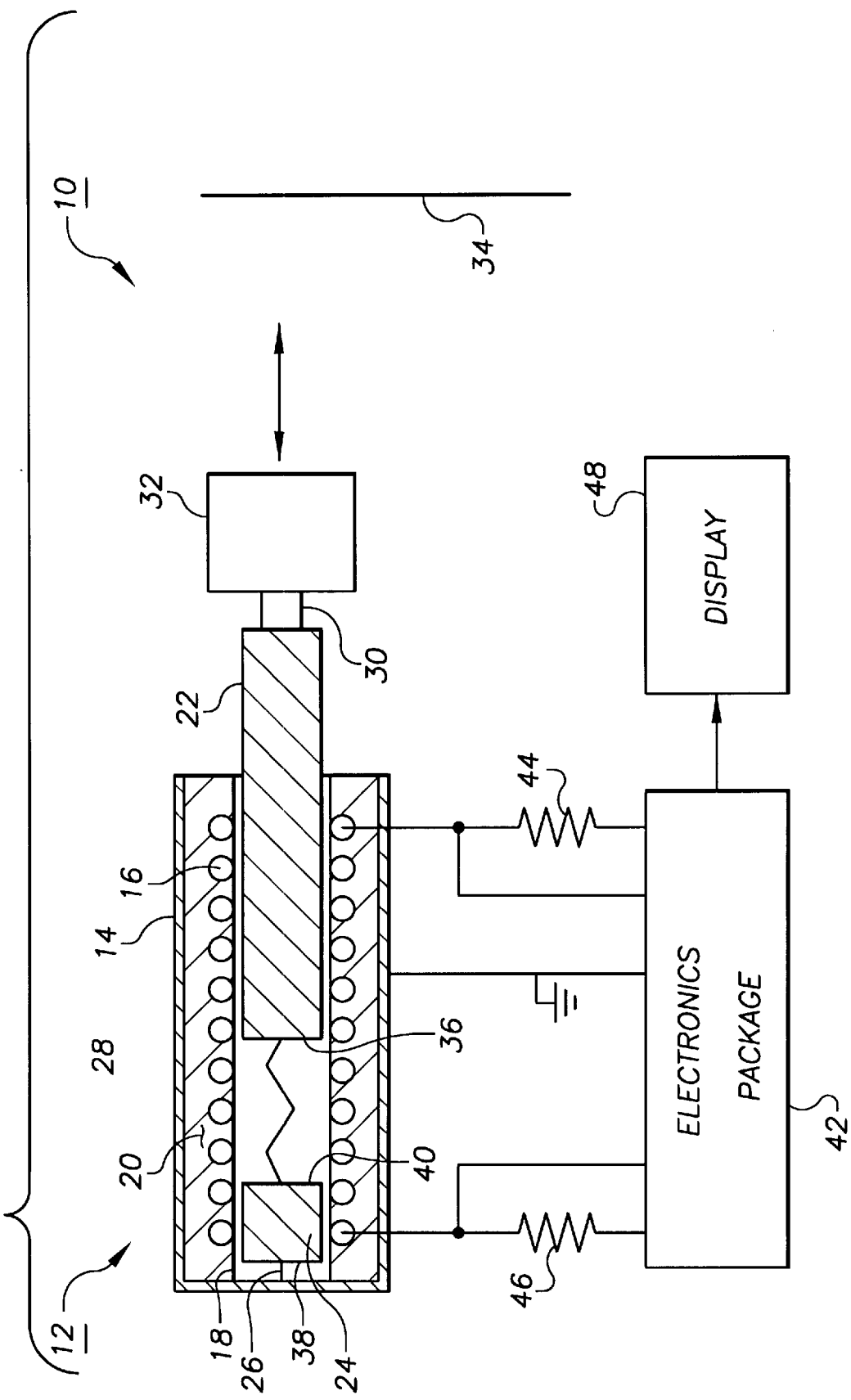
FIG. 1 illustrates, mostly in block diagram form, a time-domain reflectometry based linear position determining system which is in accord with the principles of the present invention.

FIG. 1 illustrates a preferred embodiment time-domain reflectometry based linear position measurement system 10 that incorporates a special helically wound transmission line sensor 12. That sensor includes a conductive outer shield 14 and an inductor comprised of a copper wire 16 that is closely wound in a single layer on a thin-walled hollow core 18. Located between the wire 16 and the outer shield 14 is an epoxy sealant 20. A suitable outer shield is a conductive tube made from a metal such as copper, brass, aluminum, or stainless steel. I currently prefer to use a ¾" type L copper pipe because it is low cost, easy to work with, and readily available. The wire 16 is beneficially a small diameter magnet wire. I currently prefer to use a 40 AWG magnet wire with a solderable polyurethane insulation. The core 18 should be thin-walled, insulative, and nonmagnetic. I have successfully used a thin-walled ½" inner diameter cardboard tube, such as a "body tube" used with some model rockets. While such tubes are probably not optimal because they tend to be easily damaged by handling and by the motion of the movable rod that is discussed below, cardboard tubes have the desirable features of being thin walled, rigid enough to wind, non-magnetic, and insulative. However, some type of rigid plastic may be better. The epoxy sealant 20 should be dimensionally stable, rigid after curing, insulative, and nonmagnetic. I currently use a two part epoxy designed to pot windings.

While constructing the sensor 12 is for the most part easy, filling the space with epoxy requires some care. So far the best way that I've found to fill the space is to turn two ring shaped seals (not shown) on a lathe. The seals are turned to allow the core 18 to just fit inside an inner hole while the seal just fits inside the outer shield 14. I then drill a small hole in each seal. I then bring one end of the wire 16 through the drilled hole of one seal, seat the core inside that seal, then, using 5 minute epoxy, I mount that seal between the outer shield and the core so as to create a leak-proof seal. After the epoxy sets I set the transmission line upright, carefully pour the epoxy 20 into the space, thread the other end of the wire 16 through the other seal's drilled hole, place the second seal at the top of the transmission line between the core and the outer shield, and then wait for the epoxy 20 to harden. After hardening I have a rigid transmission line with an outer shield, two exposed ends of the wire 16, and a central axial passage formed by the core.

Still referring to FIG. 1, partially inserted into the axial passage of the core 18 is an elongated, movable rod 22. Located at the opposite end of the transmission line is a short, fixed rod 24. The movable rod 22 and the fixed rod 24 are beneficially constructed from the same conductive tube. That conductive tube should closely fit within the core 18, hut not so tightly that the tube doesn't move freely.

Still referring to FIG. 1, the fixed rod 24 connects to the outer shield 14 by a conductor 26, and the movable rod connects to the fixed rod by a conductive spring 28. Thus, the movable rod 22, the fixed rod 24, and the outer shield 14 are all electrically interconnected to form a common ground reference. The end of the movable rod that extends from the transmission line connects via a linkage 30 to an object 32 whose linear position relative to some plane 34 is being measured. The internal end 36 of the movable rod beneficially terminates abruptly. The fixed rod 24 has one end 38 located outside of the winding and another end 40 that terminates abruptly at a fixed, known distance D past the start (end) of the winding. That is, the fixed rod extends into the inductor a known distance D.

Still referring to FIG. 1, the system 10 also includes an electronics package 42 that connects to the outer shield 14 (ground), to one end of the wire 16 via a direct connection and via a resistor 44, and to the other end of the wire 16 via a direct connection and via a resistor 46. The electronics package 42 also connects to a display 48 that displays the distance between the object 32 and the plane 34.

Figure 2:
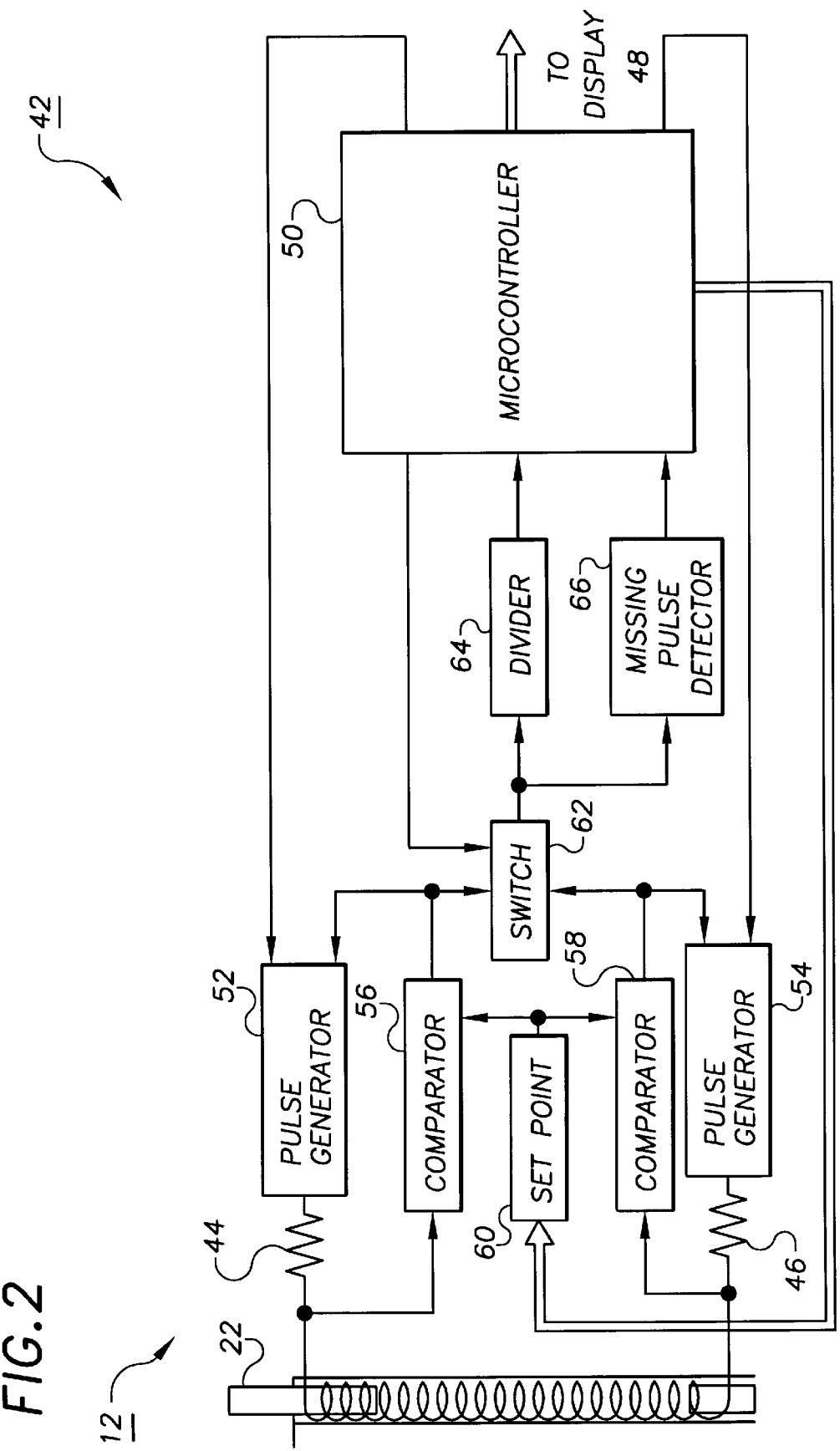
FIG. 2 illustrates the major functions of the electronics package of the system shown in FIG. 1.

Turning now to FIG. 2, the electronics package 42 includes a microcontroller 50, two pulse generators, the pulse generators 52 and 54, two comparators, the comparators 56 and 58, a set point controller 60, a switch 62, a divider 64, and a missing pulse detector 66. I currently use a Philips 87C750 device as the microcontroller 50 and an Analog Devices AD 558 digital to analog converter as the set point D/A converter 60. The comparators 56 and 58 should be fast, I currently use Maxim's MAX909 high speed comparators. For pulse generators I use 74AC74 flip/flops configured as one-shots. A 74AC04 make a good switch, and a 74HC4040 is a suitable divider. The actual division ratio of the 74HC4040 depends upon the range of motion of the object 32 and upon how the internal timer is implemented. A missing pulse detector made from a CMOS resettable one-shot is suitable.

A "simplified" description of the operation of the system 10 now will be given. First, the microcontroller 50 sends a "start" pulse to the pulse generator 52. That pulse generator then applies a 5V, 750 nanosecond wide pulse (referenced to ground) to the input of the resistor 44. That pulse passes through the resistor and travels down the sensor 12. When the pulse reaches the end of the movable rod 22 a positive reflection occurs. That reflection travels back to the resistor 44 and into the comparator 56. That comparator has a trip point that is controlled by the set point D/A converter 60. For now it will be assumed that the comparator's set point is less than the amplitude of the reflection. When the positive reflection reaches the comparator's set point the comparator 56 applies a pulse to the pulse generator 52, which then generates another pulse. By using reflections to trigger subsequent pulses a "sing-around" oscillation is created. The frequency of the sing-around oscillation depends upon the time between the transmission of one pulse and the reception of its reflection. But that time depends upon the length of the movable rod 22 that is inserted into the transmission line, which in turn depends upon the position of the object whose position is being sensed. Thus, the sing-around frequency is a function of the position of the object 32 (see FIG. 1). The sing-around frequency is then converted by the microcontroller (using a predetermined formula or a look-up table) into signals that are applied to the display 48 (see FIG. 1) that then shows the position of the object 32. Such use of a movable, transmission line ground structure to produce a position-dependent reflection that is subsequently used to determine the position of an object may never have been known or used before, particularly when the transmission line is helically wound.

Since the microcontroller 50 includes an internal timer, one simple method of determining the position of the object 32 is to first divide the sing-around frequency using the divider 64 and then find the period of the divided frequency. Then, by using a predetermined formula for converting that period into the object's position (or by using a look-up table), the position of the object can be determined. One good way to do this is to derive a linear formula (y=mx+b) from the system's actual performance. That is to plot the object's linear position verses the divided period and then to derive a linear formula using the best line approximation to that plot. Using a fixed set point as assumed above, over a 375 mm change in the position of the object and using a linear approximation an accuracy of about 25 mm was achieved.

System accuracy can be significantly improved by using an adjustable comparator set point. While the sing-around frequency is a function the position of the movable rod 22 (and thus of the object), if a fixed set point is used the sing-around frequency also depends upon the magnitude of the reflection, which actually depends upon the position of the object. That is, if the movable rod 22 is inserted into the transmission line only slightly, a large reflection occurs, but if the movable rod is inserted a long ways into the transmission line only a small reflection occurs (the reflection attenuates).

The electronics package 42 overcomes this reflection magnitude dependency by using a variable set point for the comparator. The set point controller 60 is a D/A converter that adjusts the comparator trip point under the control of the microcontroller. When using a variable set point, before the microcontroller sends a start pulse to the pulse generator (as described above) the microcontroller first applies a large digital word to the set point controller. The microcontroller then waits to let the D/A output voltage settle, and then the microcontroller sends a start pulse. The microcontroller then checks the state of the missing pulse detector 66, which outputs a logic HIGH if the sing-around oscillations do not start (or if they prematurely end). If sing-around oscillations did not start the microcontroller then applies a smaller digital word to the set point controller, waits, and then applies another start pulse. This process repeats until transmission line oscillations start. By having a set point controller 60 adjust the comparator trip point from a large value downward, the comparator trips on or very near the "peak" of the reflection. This reduces the dependency of the sing-around frequency on the magnitude of the pulse reflections. In actually operation the state of the missing pulse detector should be monitored to ensure that transmission line oscillations do not stop before a measurement is completed. Using an adjustable set point with a linear formula (y=mx+b) that was derived from system performance, over a 375 mm change in the position of the movable rod 22 an accuracy of about 6 mm was achieved.

While the use of an adjustable set point significantly improves the system accuracy, another improvement can be made to increase accuracy even further. Before explaining that improvement it should be understood that the pulse velocity on the transmission line is not uniform. Near both ends of the transmission line the pulse velocity is very nonuniform, but away from the ends the velocity eventually becomes substantially constant. This "end effect" limits the overall system accuracy when using a simple linear formula to convert the period of the divided sing-around frequency into a measurement of the position of the object 32. Furthermore, the effects of time and temperature on the pulse velocity limits the accuracy of systems that simply use reflections from the movable rod 22. However, the system 10 includes a fixed rod 24 that extends into the transmission line a known distance D, measured from the end of the inductor formed by the winding 16. That fixed rod can be used in two ways to improve system accuracy.

First, the electronics package 42, under the control of the microcontroller, sets up sing-around oscillations using the fixed rod 24. Those oscillations act as a "reference" frequency. To do that, the microcontroller 50 first selects that system operation will use the pulse generator 54 and the comparator 58. This is accomplished by setting the state of the switch 62 such that the pulse generator 54 is enabled while the pulse generator 52 is disabled. The set point is then set up as described above, a "start" pulse is applied to the pulse generator 54, a 5V, 750 nanosecond wide pulse (referenced to ground) is then applied to the resistor 46. That pulse passes through that resistor and travels up the transmission line 12 until it reaches the end of the fixed rod 24. A positive reflection then occurs. That reflection travels back to the resistor 46 and into the comparator 58. Assuming that the comparator's set point is properly set by the set point D/A converter 60 (otherwise the microcontroller adjusts the set point tries again until the set point is proper), the positive reflection trips the comparator 58, which then applies a pulse to the pulse generator 54, which then generates another pulse. A "sing-around" oscillation is then created. That sing-around oscillation frequency is then divided by the divider and converted into a time period, referred to hereinafter as TP1, which is stored in the microcontroller. Then, the microcontroller switches the switch 62 to select the pulse generator 52 and the comparator 54. Then the sign-around frequency caused by the position of the end of the movable rod 22 is determined and converted into a time period that is referred to hereinafter as TP2.

TP1 represents the pulse time delay at a distance D. Provided the distance D is sufficient to encompass the non-linear portion at the end of the transmission line, provided that the fixed and movable rods are similar (ideally they are made from the same tube or rod), provided that the transmission line is uniform (ideally it is perfectly rigid, wound with the same wire on the same core using the same machine and has a continuous outer shield), and provided that the transmission line has a uniform temperature, by subtracting TP1 from TP2 to arrive at TP3, the "end effect" can be eliminated and TP3 is linear with respect to the position of the object 32. Using the system 10 as described above with an adjustable set point, a distance D of 7 cm, TP1, TP2, and TP3, a linear formula (y=mx+b) that was derived from actual system performance, over a 375 mm change in the position of the movable rod I achieved an accuracy that was significantly better than 3 mm. Indeed, absolute accuracy has proven difficult to estimate.

The second technique of using TP1 to improve accuracy is to first recognize that the constant of a linear formula that relates linear position to TP3 is truly not a constant. That formula is an algebraic representation of a plot of distance verses period, with the slope being dependent upon the system's pulse velocity. That slope depends upon factors such as the temperature and the aging of the transmission line. Therefore the most accurate way to determine the pulse velocity is to replot distance verses time to arrive at the actual pulse velocity. Unfortunately, in most applications that is not possible. However, TP1 itself depends upon the same factors that T3 does. Therefore, the pulse velocity can be derived from TP1. Probably the easiest way to do this is to use a look-up table. If TP1 is between values X1 and X2, simply assume that the pulse velocity is Y1, if TP1 is between X2 and X3, assume that the pulse velocity is Y2, and so on. If the system is properly designed and constructed (stable epoxy resins, balanced thermal expansion between the movable rod/fixed rod and the outer shield), the pulse velocity should be relatively constant and only a limited number of memory locations should be required. Alternatively, one could use a linear formula of actual pulse velocity verses TP1 to arrive at the "constant" used in the linear function of distance verse time period.

Some final comments on the system 10. Electronic devices do not operate instantaneously. To achieve maximum accuracy it is recommended that the sing-around dependent devices (comparator/pulse generator) operate with minimal delay. Faster devices are to be preferred. Additionally, since TP1 is subtracted from TP2, when designing for maximum accuracy the electronics package should provide similar internal delays to the sing-around frequencies. Basically, match components. Furthermore, one should understand that helical transmission lines both attenuate and distort the applied pulses. Such attenuation and distortion should be taken into account in critical applications.

Systems that use the principles of the present invention have at least two major advantages over LVDTs. First, the overall length of such systems need only be a little longer than the range of the measurement being made, unlike with an LVDT wherein the overall length is about twice the measurement length.

Figure 3:
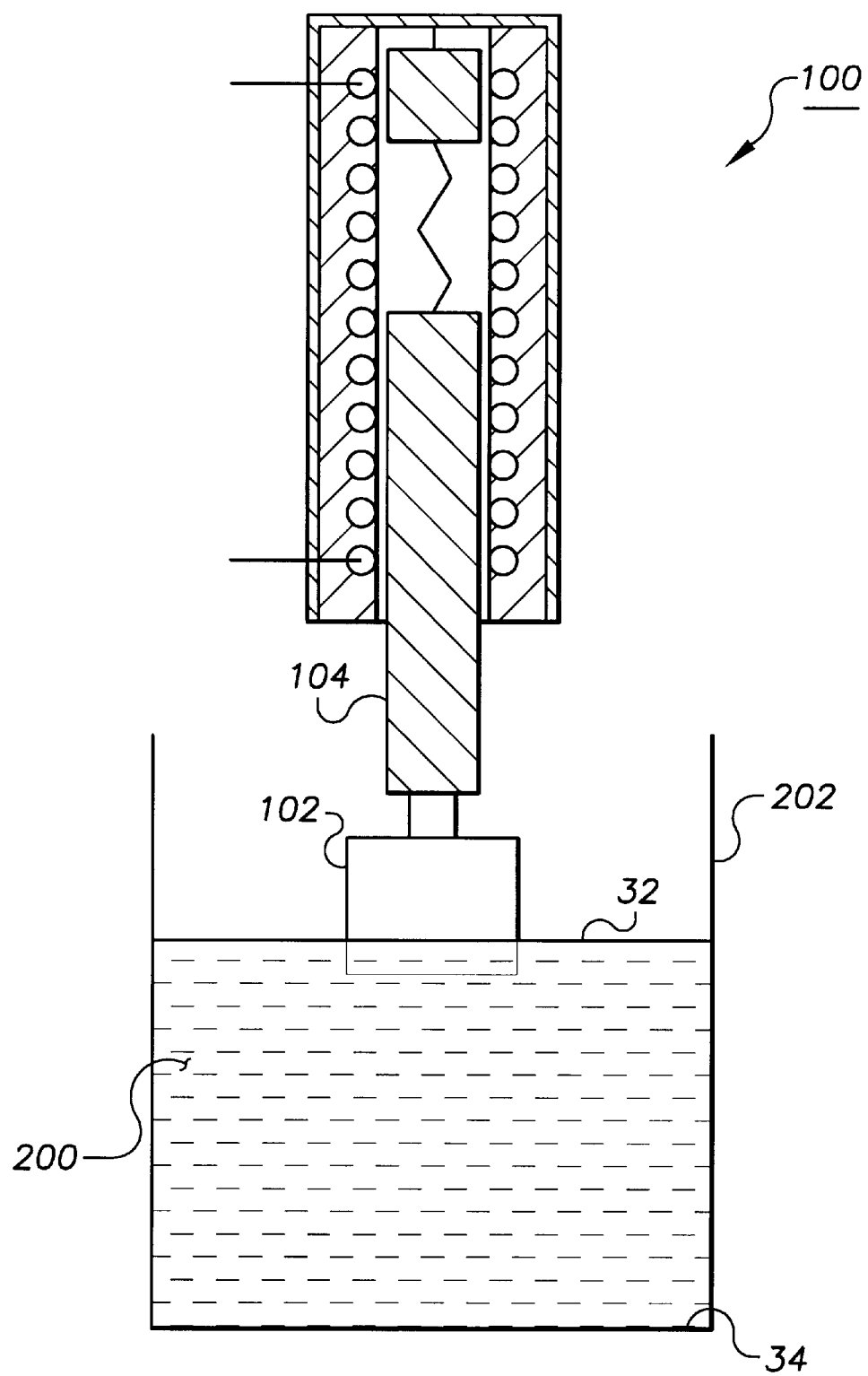
FIG. 3 illustrates a transmission line sensor measuring the level of a liquid in a tank.

The second advantage is illustrated with the help of FIG. 3. In LVDTs the sensor's movable member is made from a magnetic material, and such materials are massive. In contrast, a system in accordance with the principles of the present invention can use movable members that are very light weight Indeed, thin walled-hollow tubes work very nicely. As shown in FIG. 3 such a sensor 100 can be used with the principles of the present invention to measure liquid levels. One approach is to make the object 32 whose position is being measured the surface of a liquid 200 in a tank 202. A float 102 that floats on the liquid 200 then connects to a thin walled-hollow tube 104, which replaces the movable rod 22 of the sensor 10 shown in FIG. 1. The remainder of the sensor 100 and the sensor 12 are the same. The position of the float can be used to measure the level of the liquid 200 relative to some plane, such as a plane 34 at the bottom of the tank. The display 48 (not shown in FIG. 3) can then be calibrated to read volume (gallons or liters) or weight (assuming that the density of the liquid 200 is known) or some other desired parameter. Another application of the principles of the present invention would be to determine the density of the liquid 200. If the liquid level is known relative to the sensor, the position of the float will depend on the density of the liquid 200. Since the system 10 can accurately determine the position of the float the density of the liquid can be determined.

Figure 4:
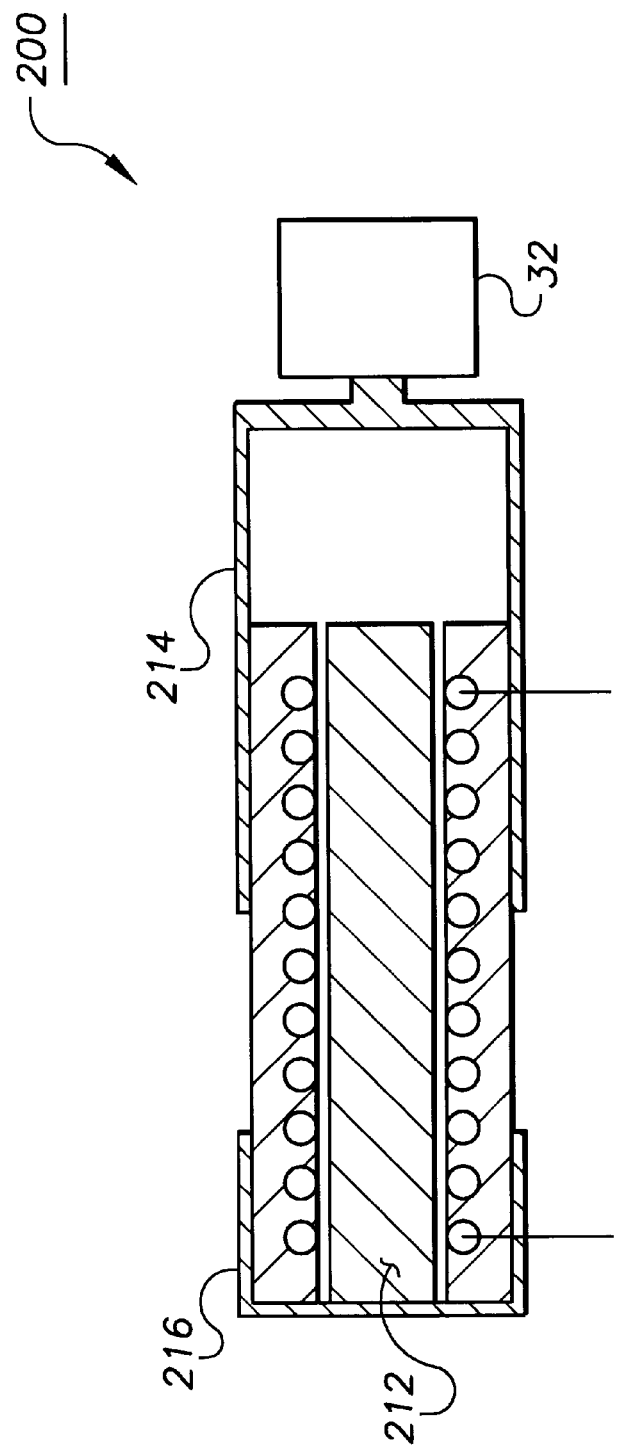
FIG. 4 illustrates an alternative transmission line sensor that is in accordance with the principles of the present invention.

It is to be understood that while the figures and the above description illustrate the present invention, they are exemplary only. Others who are skilled in the applicable arts will recognize numerous modifications and adaptations of the illustrated embodiments which will remain within the principles of the present invention. For example, the foregoing has described a system that uses a stationary outer shield 14 and a movable rod 22 that is inside the core. However, FIG. 4 shows an alternative arrangement that uses a fixed rod 212 that is inside the core and a movable outer shield 214. If a reference element similar to that of the fixed rod 24 is desired, a fixed outer element 216 could cover some of the windings (reference FIG. 4). While not specifically shown, the elements 212, 214, and 216 are electrically interconnected. Therefore, the present invention is to be limited only by the appended claims.

What I claim is:

1. A transmission line sensor, comprising:
   a single layer elongated winding having a first end and a second end;
   a first conductive member adjacent said winding and having a solid body that extends along said winding;
   a second conductive member having a solid body that partially extends along said winding and that partially extends beyond said first end, said solid body of said second conductive member having a termination end adjacent said winding; and
   a connector electrically connecting said first conductive member and said second conductive member together;
   wherein said second conductive member is movable.

2. The transmission line sensor according to claim 1, wherein the position of said termination end relative to said first end depends upon the position of an external object.

3. The transmission line sensor according to claim 1, further including a third conductive member having a body that extends a predetermined distance along said winding from said second end, wherein said third conductive member is axially aligned with said second conductive member, and wherein said third conductive member is electrically connected to said first conductive member.

4. The transmission line sensor according to claim 1, wherein said first conductive member substantially surrounds said winding, and wherein said termination end is within said winding.

5. A linear position measurement system for determining the position of an object, comprising:
   a transmission line having a single layer elongated winding having a first end and a second end, a first conductive member adjacent said winding and having a solid body that extends along said winding, and a movable second conductive member having a solid body that partially extends along said winding and that partially extends beyond said first end, said solid body of said second conductive member having a termination end adjacent said winding and an attachment operatively connected to an object whose position is being determined, wherein the position of said termination end depends upon the position of the object, and wherein said first conductive member and said second conductive member are electrically connected together;
   a signal generator for applying electrical signals between said first end and said first conductive member;
   a receiver for receiving electrical signals from said transmission line; and
   a position determining circuit for determining the position of the object based upon delays between the applications of said electrical signals and receptions of said received electrical signals.

6. A linear position measurement system according to claim 5, wherein said signal generator applies electrical pulses.

7. A linear position measurement system in accordance with claim 5, further including a dielectric material between said winding and said first conductive member.

8. A linear position measurement system in accordance with claim 5, further including a display operatively connected to said position determining circuit, said display for displaying the position of the object.

9. A linear position measuring system according to claim 6, wherein said receiver receives reflections induced by said termination end.

10. A linear position measurement system in according to claim 9, wherein the reception of a reflection triggers an electrical pulse.

11. A linear position measurement system according to claim 10, wherein said receiver includes a comparator having a set-point, wherein said comparator changes state when a reflection has a magnitude greater than said set-point.

12. A linear position measurement system according to claim 11, wherein said set-point is adjustable.

13. A linear position measuring system according to claim 10, wherein said position determining circuit determines the position of the object based upon the frequency of electrical pulses.

14. A linear position measuring system according to claim 5, wherein said position determining circuit determines the level of a liquid.

15. A linear position measurement system for determining the position of an object, comprising:
   a transmission line having a hollow elongated tube of electrically insulating material; a single layer winding having a first end and a second end, said winding comprised of a conductor that is helically wound around said elongated tube, a first conductive member adjacent said winding and having a body that extends at least from said first end to said second end, a movable second conductive member having a body that partially extends along said winding and that partially extends beyond said first end, said body of said second conductive member having a termination end adjacent said winding and an attachment for operatively connecting said second conductive member to an object whose position is being determined, wherein the position of said termination end relative to said first end depends upon the position of the object, and a third conductive member that is axially aligned with said second conductive member, wherein said third conductive member extends a predetermined distance from said second end along said winding, wherein said winding is disposed between said first conductive member and said second conductive member; and wherein said first conductive member, said second conductive member, and said third conductive member are electrically connected together;
   a first signal generator for applying electrical signals between said first conductive member and said first end;
   a second signal generator for applying electrical signals between said first conductive member and said second end;
   a first receiver for receiving reflections of said electrical signals at said first end;
   a second receiver for receiving reflections of said electrical signals at said second end; and
   a position determining circuit operatively connected to said first receiver and to said second receiver, said position determining circuit for determining the position of the object based upon delays between applications of electrical signals by said first signal generator and the receptions of reflections by said first receiver and upon delays between the applications of signals by said second signal generator and the receptions of reflections by said second receiver.

16. A linear position measuring system according to claim 15, wherein said first conductive member substantially surrounds said winding and wherein said termination end is within said elongated tube.

17. A linear position measurement system according to claim 15, wherein said first signal generator applies electrical pulses to said first end and said second signal generator applies electrical pulses to said second end.

18. A linear position measurement system in accordance with claim 15, further including a circuit for selectively controlling the application of electrical pulses to said first end and for selectively controlling the application of electrical pulses to said second end.

19. A linear position measurement system in accordance with claim 18, wherein said position determining circuit determines the position of the object based upon subtracting the delay between the applications of signals by said second signal generator and the receptions of reflections by said second receiver from the delay between the applications of electrical signals by said first signal generator and the receptions of reflections by said first receiver.

20. A linear position measurement system in accordance with claim 18, wherein the position determining circuit determines the position of the object by determining the pulse velocity along the transmission line from the predetermined distance and from the delay between the applications of pulses by said second signal generator and the receptions of reflections by said second receiver.

* * * * *